United States Patent
Coulson (10) Patent No.: US 9,868,241 B1
(45) Date of Patent: Jan. 16, 2018

(54) EXTRUSION PROCESS FOR TUBULAR MEMBER

(71) Applicant: Eldon James Corp., Denver, CO (US)

(72) Inventor: William A. Coulson, Fort Collins, CO (US)

(73) Assignee: WilMarc Holdings, LLC., Fort Collins, CO (US)

( * ) Notice: Subject to any disclaimer, the term of this patent is extended or adjusted under 35 U.S.C. 154(b) by 92 days.

(21) Appl. No.: 14/478,939

(22) Filed: Sep. 5, 2014

Related U.S. Application Data (60) Provisional application No. 61/874,891, filed on Sep. 6, 2013.

(51) Int. Cl.
| | | |
|---|---|---|
| *B29C 47/90* | (2006.01) | |
| *B29C 47/00* | (2006.01) | |
| *B29D 23/00* | (2006.01) | |
| *B29C 47/88* | (2006.01) | |
| *B29C 47/20* | (2006.01) | |
| *B29L 23/00* | (2006.01) | |
| *B29K 101/00* | (2006.01) | |

(52) U.S. Cl.
CPC .......... *B29C 47/0023* (2013.01); *B29C 47/20* (2013.01); *B29C 47/8835* (2013.01); *B29C 47/8895* (2013.01); *B29C 47/903* (2013.01); *B29C 47/905* (2013.01); *B29D 23/00* (2013.01); *B29K 2101/00* (2013.01); *B29L 2023/00* (2013.01)

(58) Field of Classification Search
CPC ..... B29C 47/20; B29C 47/882; B29C 47/883; B29C 47/8835; B29C 47/8895; B29C 47/903; B29C 47/905
See application file for complete search history.

(56) References Cited

U.S. PATENT DOCUMENTS

| | | | | |
|---|---|---|---|---|
| 3,539,670 A | * | 11/1970 | Hall | B29C 49/14 264/532 |
| 4,543,051 A | * | 9/1985 | Maillefer | B29C 47/0023 264/178 R |
| 4,886,634 A | * | 12/1989 | Strutzel | B29C 47/0026 264/209.4 |
| 5,516,270 A | * | 5/1996 | Lehtinen | B29C 47/903 264/178 R |
| 5,648,102 A | * | 7/1997 | Czarnik | B29C 47/903 264/562 |

OTHER PUBLICATIONS

U.S. Appl. No. 61/874,891, filed Sep. 6, 2013.

* cited by examiner

*Primary Examiner* — Yogendra Gupta
*Assistant Examiner* — Joseph Leyson
(74) *Attorney, Agent, or Firm* — Craig R. Miles; CR MILES P.C.

(57) ABSTRACT

An extrusion system for the production of polymeric tubes and a method of extruding polymeric tubes which reduce or obviate deformation or collapse of the polymeric tube upon egress from a die of an extruder.

27 Claims, 10 Drawing Sheets

EXTRUSION PROCESS FOR TUBULAR MEMBER

This United States Non-Provisional Patent Application claims the benefit of U.S. Provisional Patent Application No. 61/874,891, filed Sep. 6, 2013, hereby incorporated by reference herein.

I. FIELD OF THE INVENTION

An extrusion system for the production of polymeric tubes and a method of extruding polymeric tubes which reduce or obviate deformation or collapse of the polymeric tube upon egress from a die of an extruder.

II. BACKGROUND OF THE INVENTION

Extrusion is a process used to create objects of a fixed cross-sectional profile. A material is pushed or drawn through a die of the desired cross section. The two main advantages of this process over other manufacturing processes are its ability to create very complex cross sections and work materials that are brittle, because the material only encounters compressive and shear stresses.

Hollow cavities within extruded material cannot be produced using a simple flat extrusion die, as there would be no way of supporting the center barrier of the die. Alternatively, the die assumes the shape of a block with depth, beginning first with a shape profile that supports the center section. The die shape then internally changes along its length into the final shape, with the suspended center pieces supported from the back of the die.

Once the polymeric tube egresses from the die, the polymeric tube, being no longer supported by the die, may have a tendency to deform or collapse.

III. SUMMARY OF THE INVENTION

Accordingly, a broad object of a particular embodiment of the invention can be to provide an extrusion system configured to act on a polymeric tube as it egresses from a die to reduce or obviate deformation or collapse of the polymeric tube.

Another broad object of a particular embodiment of the invention can be to provide an extrusion system including a perforated tubular member having a perforated tubular member length disposed between a perforated tubular member first end and a perforated tubular member second end, the perforated tubular member having a perforated tubular member external surface and a perforated tubular member internal surface defining a perforated tubular member passage between the perforated tubular member first and second ends; and a fluid injector having a fluid injector internal flow path terminating in an annular outlet disposed adjacent the perforated tubular member first end, the annular outlet configured to align with the perforated tubular member internal surface proximate the perforated tubular member first end to conduct an amount of coolant to the perforated tubular member internal surface; the fluid injector having a fluid injector bore wall defining a fluid injector central bore disposed adjacent the perforated tubular member first end, the fluid injector bore wall and the perforated tubular member internal surface having a coincident longitudinal axis.

Another broad object of a particular embodiment of the invention can be to provide an extrusion system further including a bath having a bath interior space, whereby the perforated tubular member couples to the bath to locate the perforated tubular member second end a distance within the bath interior space.

Another broad object of a particular embodiment of the invention can be to provide a vacuum generator coupled to the bath, the vacuum generator adapted to generate a reduced pressure within the bath interior space, whereby the reduced pressure within the bath interior space acts to draw a polymeric tube external surface toward a perforated tubular member internal surface as a polymeric tube passes through the perforated tubular member passage.

Another broad object of a particular embodiment of the invention can be to provide a method of extruding a polymeric tube which reduces or obviates deformation or collapse of the polymeric tube.

Naturally, further objects of the invention are disclosed throughout other areas of the specification, drawings, and claims.

V. DETAILED DESCRIPTION OF THE INVENTION

Now referring generally to FIG. 1 through FIG. 12, which show an illustrative extrusion system (1), method of extruding a polymeric tube (2), and a polymeric tube (3) in accordance with the method of the invention.

The term "polymeric tube" for the purposes of this invention means a tubular member (4), usually but not necessarily of circular cross section (5), having a polymeric tube wall thickness (6), usually but not necessarily a uniform polymeric tube wall thickness (6), disposed between a polymeric tube external surface (7) and a polymeric tube internal surface (8) which defines a generally hollow polymeric tube passage (9) extending between opposed polymeric tube ends (10), whereby the tubular member (4) is made from a polymeric material (11).

The term "polymeric material" for the purposes of this invention means a thermoplastic polymer(s) which can be heated and reformed and, without limitation to the breadth of the foregoing, includes as illustrative examples: thermoplastic elastomers such as styrene block copolymers, polyolefin blends, elastomeric alloys, thermoplastic polyurethanes, thermoplastic copolyesters, thermoplastic polyamides; polypropylene, polyethylene, high density polyethylene, low density polyethylene, polyvinylidene fluoride, acrylonitrile butadiene styrene, polyvinylchloride, polyether block amide, or the like, or combinations thereof.

The term "durometer" for the purposes of this invention means the ASTM D2240 standard for the measure of hardness of a material.

Figure 1:
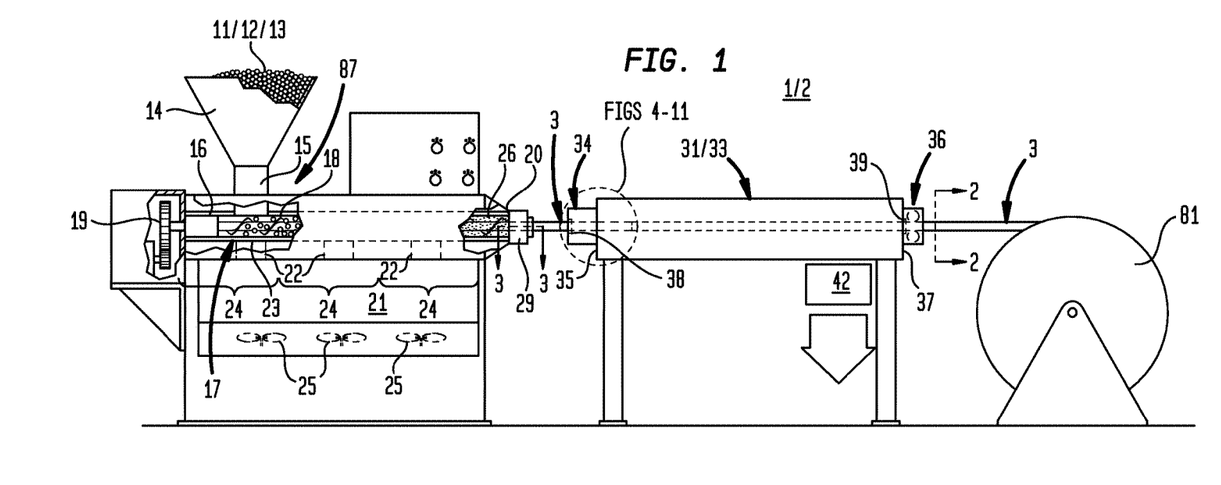
FIG. 1 is illustration of an extrusion system adapted for use with the inventive method of producing a polymeric tube.
Figure 2:
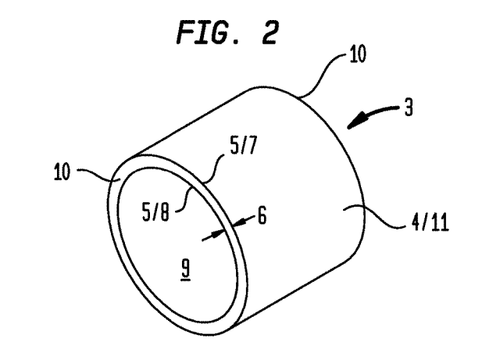
FIG. 2 is a cross-sectional view 2-2 shown in FIG. 1 of an exemplary embodiment of a polymeric tube produced using the inventive method.

Now referring primarily to FIG. 1, the polymeric material (11) can be provided in the form of nurdles (12) which generally take the form of small granules or beads (also referred to in the industry as "resin"). The polymeric material (11) can further include one or more additives (13) such as plasticizers, fillers, pigments, colorants, ultraviolet radiation inhibitors, or the like, which can be included during production of the polymeric material (11) or can be provided as a liquid(s) or as a solid(s) which can be mixed with the nurdles (12).

The nurdles (12) can be disposed in a hopper (14) and fed under influence of gravity through a feed throat (15) of the hopper (14) proximate a barrel rear end (16) of a barrel (17). A screw (18) rotatably journaled in the barrel (17) contacts the nurdles (12) entering the barrel rear end (16). A driver (19) operates to rotate the screw (18) inside the barrel (17), forcing the nurdles (12) toward a barrel front end (20) of the barrel (17). The rate at which the screw (18) rotates in the barrel (17) can be adjusted but generally the screw (18) rotates up to about 120 revolutions per minute; however, the invention need not be so limited, as the screw (18) can rotate at any rate sufficient to move the nurdles (12) from the barrel rear end (16) toward the barrel front end (20), including rates lesser or greater than 120 revolutions per minute, depending upon the application. As to particular embodiments, the screw (18) can be driven at a continuous rate or at a variable rate, depending upon the application.

Again referring primarily to FIG. 1, a heater (21) can be coupled to the barrel (17) to heat the barrel (17) to a desired temperature. One or more temperature sensors (22) can be disposed in a barrel wall (23) to sense the temperature along the length of the barrel (17), which can be controlled to achieve the melt point of the nurdles (12) (the temperature at which the nurdles (12) begin to turn from a solid to a liquid, also referred to as "molten polymeric material" (26)).

The melt point can vary between different polymeric materials (11) but typically occurs within a range from between about 200° Celsius (about 392° Fahrenheit) to about 275° Celsius (about 527° Fahrenheit); however, particular polymeric materials (11) may have a melt point which occurs at a lesser or greater temperature.

A heating profile can be set for the barrel (17) in which one or more temperature-controlled heater zones (24) gradually increase the temperature of the barrel (17) from the barrel rear end (16) to the barrel front end (20). This allows the nurdles (12) of polymeric material (11) to melt gradually as they are forced along the length of the barrel (17) toward the barrel front end (20).

As to particular embodiments, the screw (18) acting on the nurdles (12) can generate an amount of pressure or friction which can generate an additional amount of heat. The heat of the pressure or friction can be sufficient to achieve or maintain the melt point of the polymeric material (11) inside of the barrel (17). The extrusion system (1) can further include a cooling element (25), such as a fan or water jacket, to maintain the temperature at or below a temperature set point.

Figure 3:
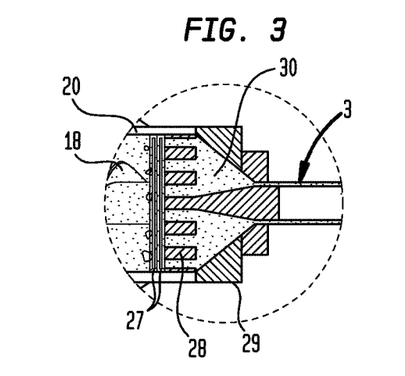
FIG. 3 is a cross-sectional view 3-3 shown in FIG. 1 of an exemplary embodiment of a die through which molten polymeric material passes in the production of a polymeric tube in accordance with the inventive method.

Now referring primarily to FIG. 3, at the barrel front end (20), molten polymeric material (26) egresses from the screw (18) and can be forced through one or more screens (27) to remove any contaminants in the molten polymeric material (26). The one or more screens (27) can be reinforced by a breaker plate (28) which can take the form of a thick metal disk having a plurality of bores communicating between opposed sides. The one or more screens (27) and breaker plate (28) acting on the molten polymeric material (26) can generate a substantial back pressure of the polymeric material (11) in the barrel (17). The configuration of the one or more screens (27) with respect overall dimensional relations, wire size, total open area, or other parameters and the configuration of the breaker plate (28) with respect to overall dimensional relations, bore size, total open area, or other parameters can be adjusted to correspondingly adjust the amount of back pressure in the barrel (17) as required for uniform melting and proper mixing of the polymeric material (11). The back pressure can vary greatly depending upon the polymeric material (11) utilized, the configuration of the polymeric tube (3) being produced, or other parameters, typically occurring in a range of between about 1,000 psi (about 7 Mpa) to about 10,000 psi (about 70 Mpa); although particular applications may generate a lesser or greater back pressure. The breaker plate (28) can also function to convert "rotational memory" of the molten polymeric material (26) into "longitudinal memory" of the molten polymeric material (26). After passing through the breaker plate (28), the molten polymeric material (26) passes through a die (29) having a die passage (30) configured to generate a polymeric tube (3).

Now referring primarily to FIG. 4 through FIG. 12, as to particular embodiments, the invention can include a mounting flange (48) adapted to be secured in fixed relation to a bath inlet side (35) of the bath (31). The mounting flange (48) can include a mounting flange bore wall (89) which defines a mounting flange central bore (49) communicating between opposed mounting flange first and second sides (50)(51). The mounting flange (48) can further include an annular recess (52) disposed in the mounting flange first side (50) about the mounting flange central bore (49).

Now referring primarily to FIG. 4, and FIG. 10 through FIG. 12, a perforated tubular member (53), usually, but not necessarily, of circular cross section, can have a perforated tubular member length (54) disposed between a perforated tubular member first end (55) and a perforated tubular member second end (56). The perforated tubular member first end (55) can terminate in a perforated tubular member annular flange (57) having a perforated tubular member annular flange periphery (58) configured to mate with the annular recess (52) disposed in the mounting flange first side (50) about the mounting flange central bore (49). As to particular embodiments, the perforated tubular member annular flange (57) can have a thickness greater than then depth of the annular recess (52). The perforated tubular member (53) can pass through the mounting flange central bore (49) to engage the perforated tubular member annular flange (57) within the annular recess (52).

The perforated tubular member (53) can have a perforated tubular member external surface (82) and a perforated tubular member internal surface (60), whereby the perforated tubular member internal surface (60) defines a perforated tubular member passage (83) between the perforated tubular member first and second ends (55)(56).

As to particular embodiments, the perforated tubular member internal surface (60) can be configured in substantially the same configuration as the polymeric tube external surface (7), whereby the perforated tubular member internal surface (60) can have sufficiently greater dimension than the polymeric tube external surface (7) to allow a layer of coolant (68) to be generated between the perforated tubular member internal surface (60) and the polymeric tube external surface (7) when the polymeric tube (3) is received within the perforated tubular member passage (83).

Again referring primarily to FIG. 4, and FIG. 10 through FIG. 12, a fluid injector (69) can be coupled adjacent the perforated tubular member annular flange (57) to generate the layer of coolant (68) between the perforated tubular member internal surface (60) and the polymeric tube external surface (7) when the polymeric tube (3) is received within the perforated tubular member passage (83). A fluid injector coolant conduit (84) can be coupled to the fluid injector (69) to deliver a fluid injector coolant flow (67) to a fluid injector internal flow path (72).

Again referring primarily to FIG. 4, and FIG. 10 through FIG. 12, the fluid injector internal flow path (72) can terminate in an annular outlet (73), which can be disposed adjacent the perforated tubular member first end (55). The annular outlet (73) can be configured to align with the perforated tubular member internal surface (60) proximate the perforated tubular member first end (55) to conduct an amount of coolant (32) to the perforated tubular member internal surface (60).

The fluid injector (69) can have a fluid injector bore wall (85) defining a fluid injector central bore (74) disposed adjacent the perforated tubular member first end (55), whereby the fluid injector bore wall (85) and the perforated tubular member internal surface (60) have a coincident longitudinal axis (86). As to particular embodiments, the annular outlet (73) can be disposed between the fluid injector bore wall (85) and the perforated tubular member first end (55) to conduct an amount of coolant (32) to the perforated tubular member internal surface (60).

Again referring primarily to FIG. 4, and FIG. 10 through FIG. 12, as to particular embodiments, the fluid injector (69) can further include a pair of annular rings (70)(71) configured such that upon mated engagement, the pair of annular rings (70)(71) define the fluid injector internal flow path (72) terminating in the annular outlet (73) and the fluid injector bore wall (85) defining the fluid injector central bore (74) disposed adjacent the perforated tubular member first end (55).

Now referring primarily to FIG. 1, FIG. 4, and FIG. 10 through FIG. 12, as to particular embodiments, the extrusion system (1) can further include a bath (31) having a bath interior space (43), whereby the perforated tubular member (53) couples to the bath (31) to locate the perforated tubular member second end (56) a distance (59) within the bath interior space (43). Accordingly, the perforated tubular member length (54) can be sufficient to allow the perforated tubular member second end (56) to be located the distance (59) within the bath interior space (43). As to particular embodiments, the perforated tubular member length (54) can be in a range of between about 1 inch (about 25.4 millimeters) to about 3 inches (about 76.2 millimeters); however, the invention need not be so limited, as the perforated tubular member length (54) can be lesser or greater, depending upon the application, whereby a lesser perforated tubular member length (54) can extend a lesser distance (59) within the bath interior space (43) and a greater perforated tubular member length (54) can extend a greater distance (59) within the bath interior space (43).

Figure 10:
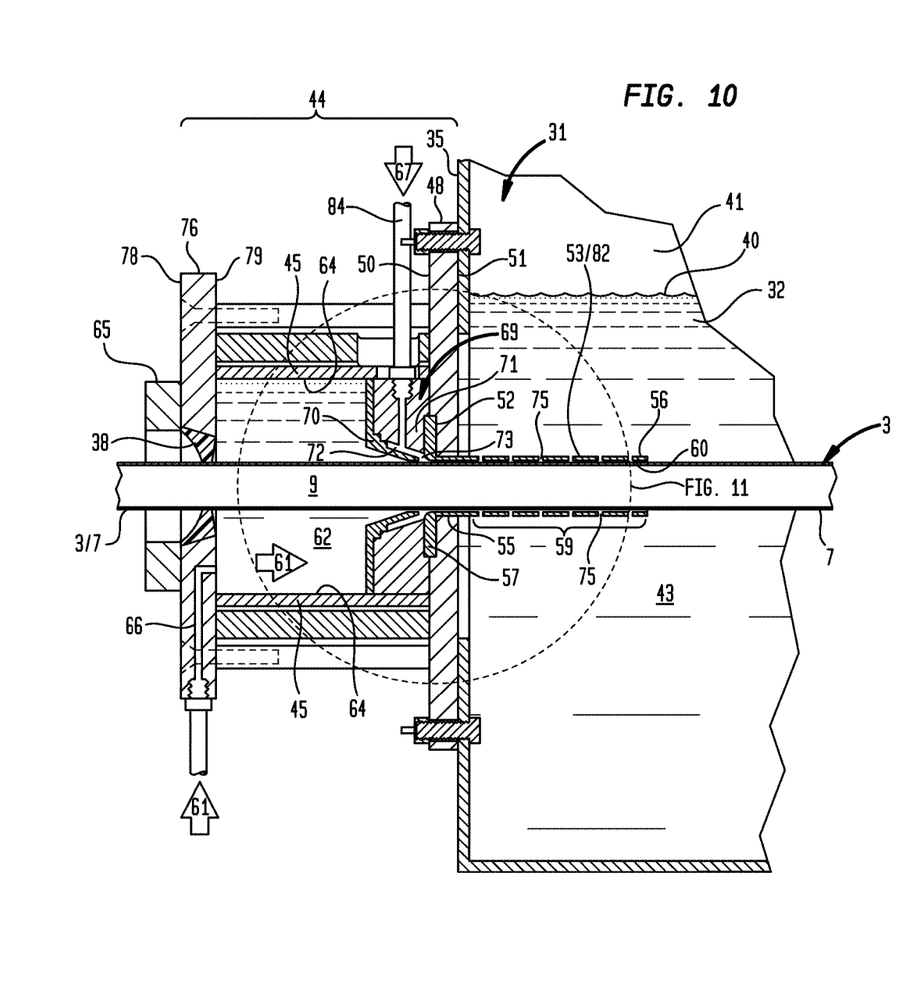
FIG. 10 is a cross-sectional view 10-10 shown in FIG. 5 of the particular embodiment of the water jacket including a fluid injector which generates a fluid layer between a perforated pipe internal surface and a polymeric tube external surface.

Again referring primarily to FIG. 1, FIG. 4, and FIG. 10 through FIG. 12, the extrudate can egress from the die (29) in the form of a polymeric tube (3) and can be cooled by drawing the polymeric tube (3) through the bath interior space (43) containing an amount of coolant (32) (as shown in the example of FIG. 10), which can typically, but not necessarily, be water. As to particular embodiments, the bath interior space (43) can be filled with an amount of coolant (32) to a level exceeding a height of the perforated tubular member (53) extending the distance (59) within the bath interior space (43). Accordingly, the coolant (32) can surround the perforated tubular member (53) and a polymeric tube (3) received within the perforated tubular member passage (83).

In the production of polymeric tubes (3) in accordance with the invention, the bath (31) can take the form of an elongate enclosure (33) having an extrudate inlet (34) mounted in relation to the bath inlet side (35) and an extrudate outlet (36) mounted in relation to a bath outlet side (37). The extrudate inlet (34) and the extrudate outlet (36) can correspondingly include an extrudate inlet seal (38) and an extrudate outlet seal (39) configured to sufficiently engage the polymeric tube external surface (7) to maintain a coolant level (40) within the bath interior space (43) between the extrudate inlet (34) and the extrudate outlet (36) through which the polymeric tube (3) passes for cooling. The remaining bath interior space (43) can provide a headspace (41) within the bath interior space (43). Once cooled, the polymeric tube (3) can be wound on a spool (81), or cut into lengths for use, or otherwise used or stored.

Again referring primarily to FIG. 1, FIG. 4, and FIG. 10 through FIG. 12, as to particular embodiments, the extrusion system (1) can further include a vacuum generator (42) coupled to the bath (31), whereby the vacuum generator (42) can be adapted to generate a reduced pressure within the bath interior space (43) in relation to the ambient pressure outside the bath (31). As to particular embodiments, the vacuum generator (42) can act at the extrudate inlet seal (38) and the extrudate outlet seal (39) to generate a reduced pressure within the bath interior space (43), drawing the layer of coolant (68), generated between the perforated tubular member internal surface (60) and the polymeric tube external surface (7) when the polymeric tube (3) is received within the perforated tubular member passage (83), through perforations (75) communicating between the perforated tubular member internal surface (60) and the perforated tubular member external surface (82) toward the bath interior space (43) to counter the tendency of the molten polymeric material (26) forming the polymeric tube (3) toward deformation or collapse. Further, the reduced pressure within the bath interior space (43) can act to draw the polymeric tube external surface (7) toward the perforated tubular member internal surface (60) as the polymeric tube (3) passes through the perforated tubular member passage (83).

Again referring primarily to FIG. 1, FIG. 4, and FIG. 10 through FIG. 12, as to particular embodiments, the extrusion system (1) can further include an extruder (87) configured to extrude the polymeric tube (3), whereby upon egress from the die (29) of the extruder (87), the polymeric tube (3) can pass through the fluid injector central bore (74) into the perforated tubular member passage (83) and into the bath interior space (43).

Figure 4:
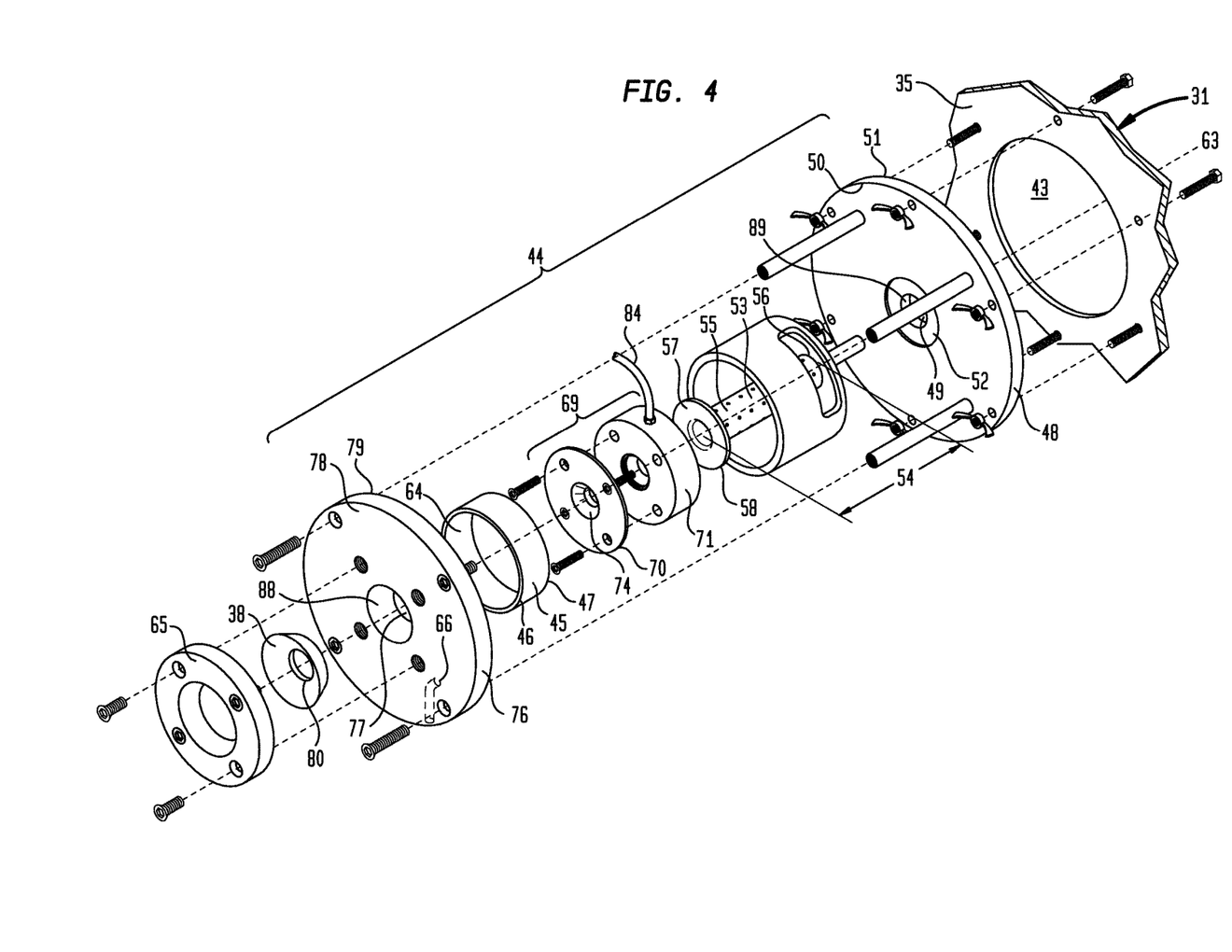
FIG. 4 is an exploded view of a particular embodiment of a water jacket coupled to a bath which is utilized in the inventive method.
Figure 5:
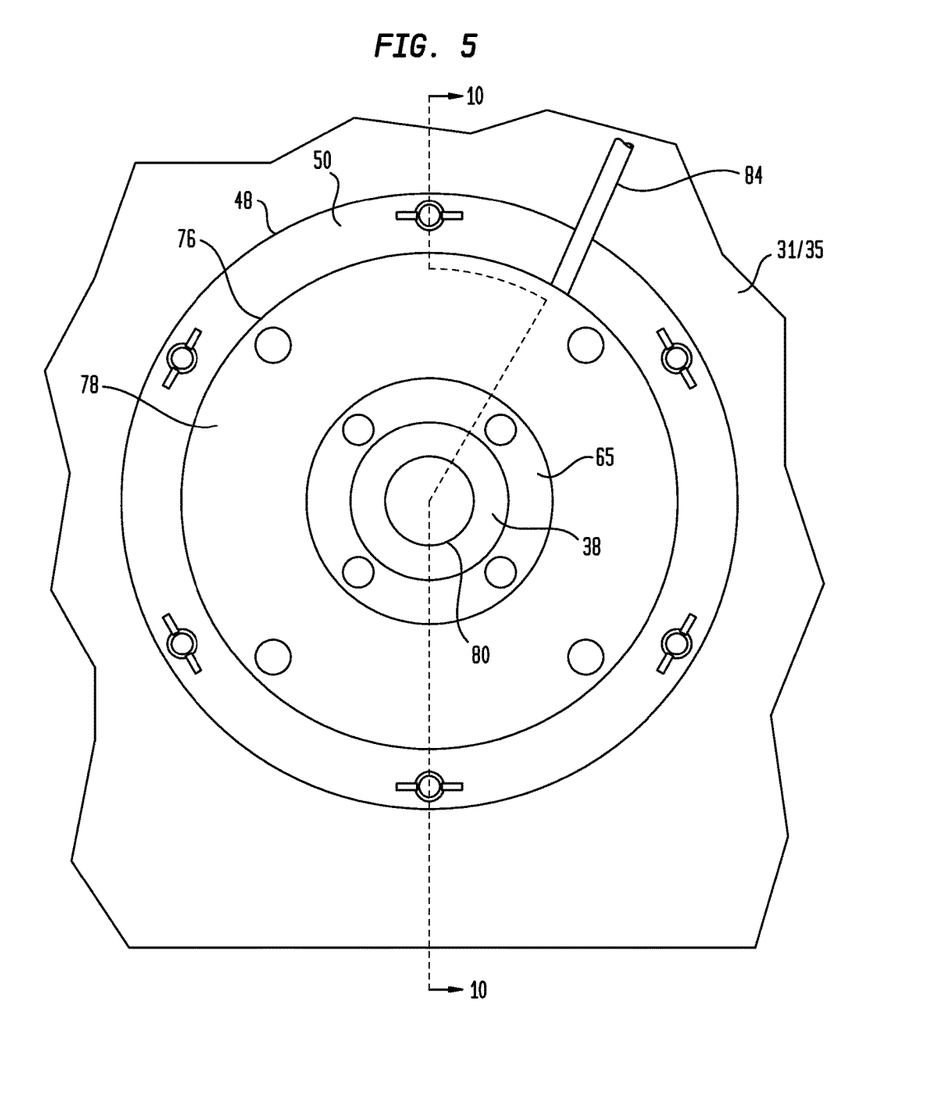
FIG. 5 is a front end view of the particular embodiment of the water jacket shown in FIG. 4.
Figure 6:
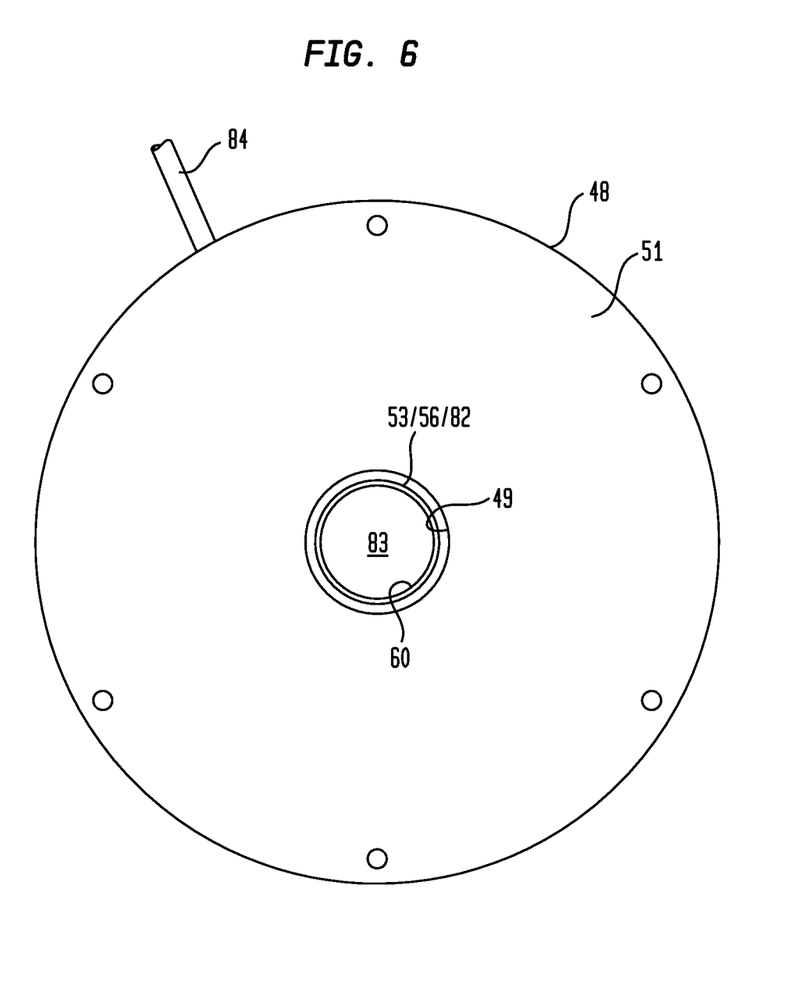
FIG. 6 is rear end view of the particular embodiment of the water jacket shown in FIG. 4.
Figure 7:
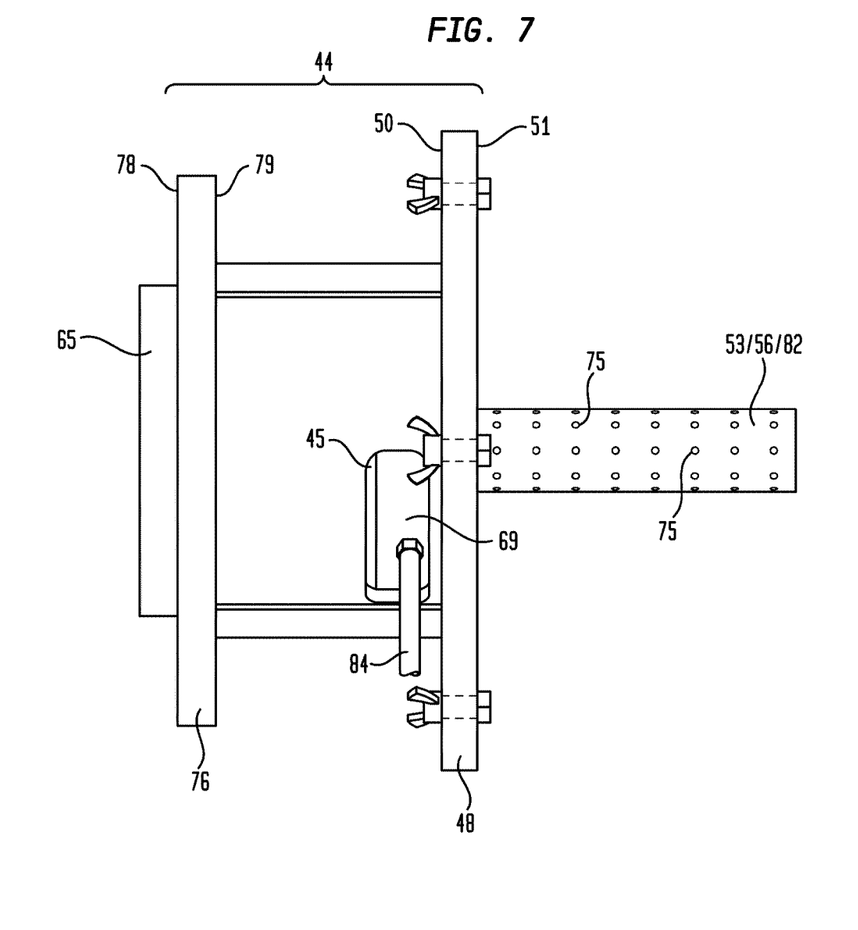
FIG. 7 is a top view of the particular embodiment of the water jacket shown in FIG. 4.
Figure 8:
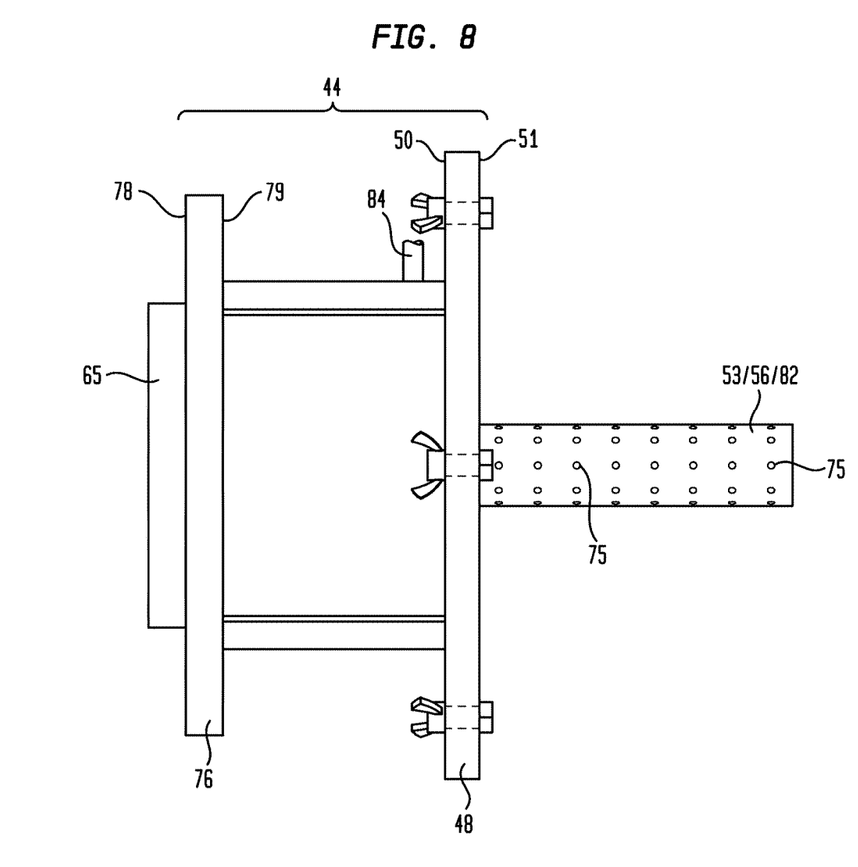
FIG. 8 is a bottom view of the particular embodiment of the water jacket shown in FIG. 4.
Figure 9:
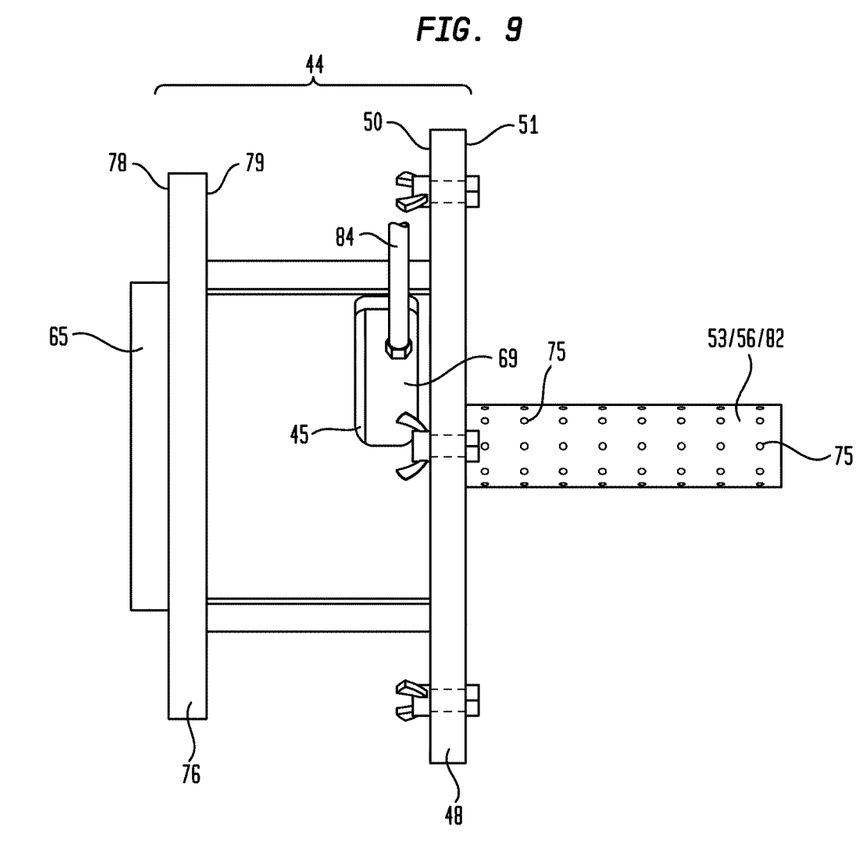
FIG. 9 is a side view of the particular embodiment of the water jacket shown in FIG. 4.

Now referring primarily to FIG. 4 and FIG. 10, as to particular embodiments, the extrusion system (1) can further include a jacket assembly (44) disposed between a retaining plate (76) and the mounting flange (48) about the fluid injector (69). The illustrative jacket assembly (44) shown in the figures includes a tubular jacket (45), usually, but not necessarily, of circular cross section, having a tubular jacket length disposed between a tubular jacket first end (46) and a tubular jacket second end (47), whereby the tubular jacket first end (46) can engage the retaining plate (76) and the tubular jacket second end (47) can engage the mounting flange (48).

The retaining plate (76) can have a retaining plate bore wall (88) which defines a retaining plate central bore (77) communicating between a retaining plate first side (78) and a retaining plate second side (79), whereby the retaining plate central bore (77) can be aligned with the fluid injector central bore (74). The retaining plate second side (79) engaged with the tubular jacket first end (46) can substantially align the retaining plate central bore (77) with the mounting flange central bore (49).

As to particular embodiments, the extrudate inlet seal (38) can be secured in fixed engagement to the retaining plate (76), aligning an extrudate inlet seal aperture element (80) with a longitudinal axis (63) of the tubular jacket (45) and the perforated tubular member (53). As shown in the example of FIG. 4, the extrudate inlet seal (38) can be secured between an annular member (65) and the retaining plate (76).

Now referring primarily to FIG. 4 and FIG. 10, a jacket assembly internal surface (64) can define a jacket assembly internal space (62) which receives a jacket assembly coolant flow (61) through a jacket assembly coolant conduit (66) coupled to the jacket assembly (44). As to particular embodiments, the jacket assembly coolant conduit (66) can be disposed in the retaining plate (76). The jacket assembly coolant flow (61) can pass through the fluid injector central bore (74) and join the layer of coolant (68) between the perforated tubular member internal surface (60) and the polymeric tube external surface (7).

Figure 11:
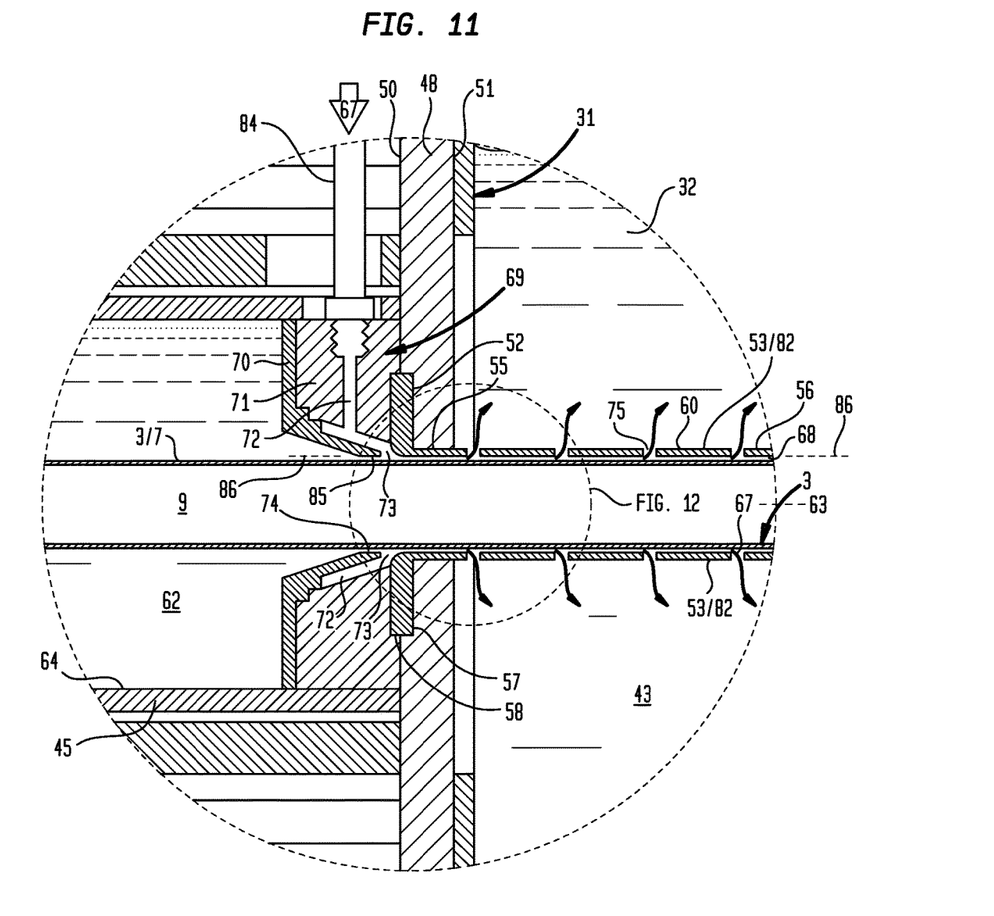
FIG. 11 is an enlargement of a portion of the cross-sectional view shown in FIG. 10.
Figure 12:
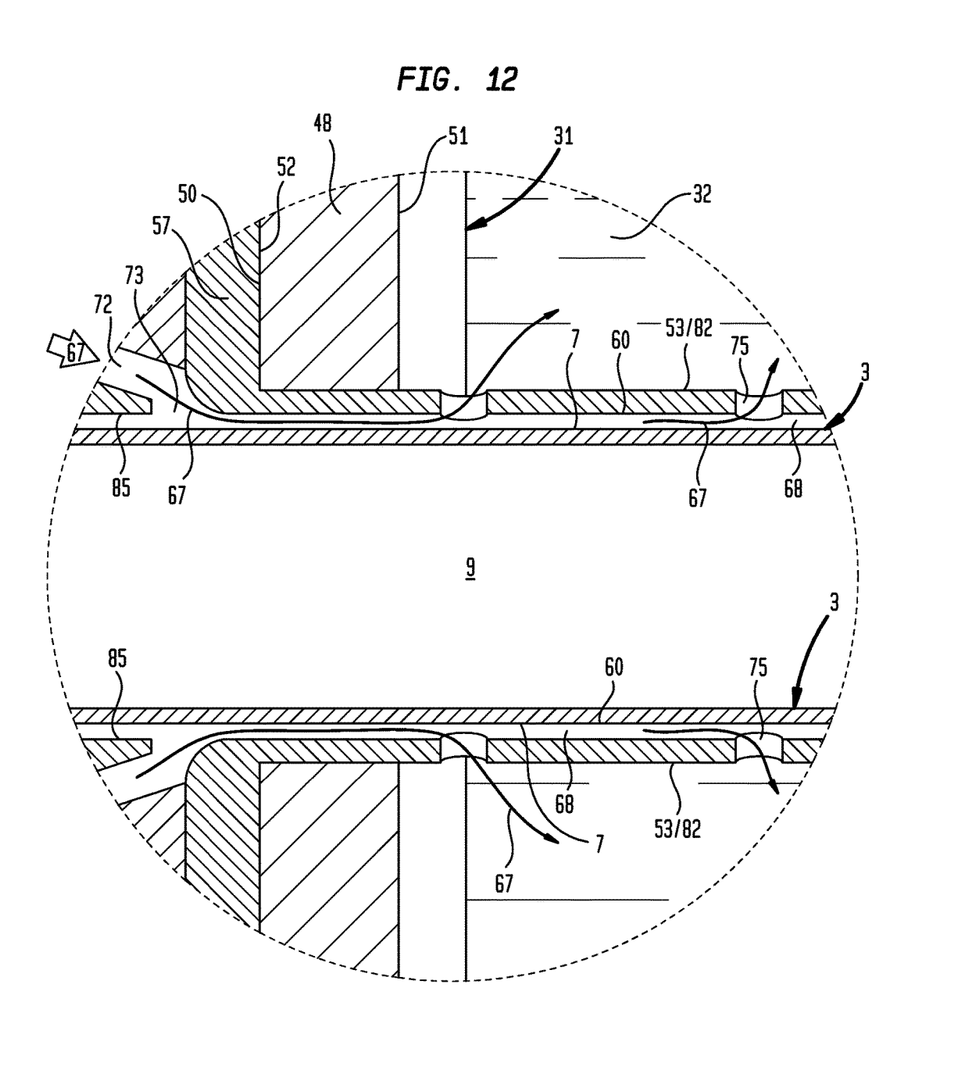
FIG. 12 is an enlargement of a portion of the cross-sectional view shown in FIG. 11.

Now referring primarily to FIG. 10 through FIG. 12, in accordance with the inventive extrusion system (1) and inventive method of extruding a polymeric tube (2), molten polymeric material (26) of the polymeric tube (3) can pass through the extrudate inlet seal (38) and the perforated tubular member (53) to egress from the perforated tubular member second end (56) a distance (59) into the bath (31). The vacuum generator (42) can be adjusted to reduce pressure sufficiently within the bath interior space (43) or in relation to the perforated tubular member (53) to act on the polymeric tube (3) to offset in whole or in part the tendency of the polymeric tube (3) to deform or collapse. The polymeric tube (3) can be sufficiently supported by the perforated tubular member (53) and the reduced pressure acting on the polymeric tube external surface (7) to reduce or obviate deformation or collapse of the polymeric tube (3).

The inventive extrusion system (1) and inventive method of extruding a polymeric tube (2) can be used to produce polymeric tubes (3) over a wide range of shore durometer. Even soft and extra soft polymeric tubes (3), which can be difficult to produce or cannot be produced using conventional extrusion systems and conventional extrusion methods, can be produced using the above described inventive extrusion system (1) and method of extruding a polymeric tube (2). For example, particular polymeric tubes (3) can be produced using the inventive extrusion system (1) or inventive method of extruding a polymeric tube (2) having a shore durometer in a range of between about 20 Å to about 90 Å or in a range of between about 20 D to about 90 D. Even polymeric tubes (3) of an extra soft or soft polymeric material (11), such as those having a shore durometer in a range of between about OO20 to about OO50 or in a range of between about A10 to about A30, can be produced with the inventive extrusion system (1) or inventive method of extruding a polymeric tube (2) to reduce deformation or obviate deformation or collapse of the polymeric tube (3) upon egress from the die (29) and passage through the bath (31).

As to particular embodiments, conventional extruders or baths can be retrofitted to provide an embodiment of the inventive extrusion system (1) or allow use of the inventive method of extruding a polymeric tube (2) to produce a polymeric tube (3), as above described.

A method of producing an extrusion system (1) can include providing a perforated tubular member (53) having a perforated tubular member length (54) disposed between a perforated tubular member first end (55) and a perforated tubular member second end (56), whereby the perforated tubular member (53) has a perforated tubular member external surface (82) and a perforated tubular member internal surface (60) defining a perforated tubular member passage (83) between the perforated tubular member first and second ends (55)(56); providing a fluid injector (69) having a fluid injector bore wall (85) defining a fluid injector central bore (74) and a fluid injector internal flow path (72) terminating in an annular outlet (73); disposing the fluid injector central bore (74) adjacent the perforated tubular member first end (55) such that the fluid injector bore wall (85) and the perforated tubular member internal surface (60) have a coincident longitudinal axis (86); disposing the annular outlet (73) adjacent the perforated tubular member first end (55); and aligning the annular outlet (73) with the perforated tubular member internal surface (60) proximate the perforated tubular member first end (55) to conduct an amount of coolant (32) to the perforated tubular member internal surface (60).

As to particular embodiments, the method can further include configuring the fluid injector (69) as a pair of annular rings (70)(71) which, upon mated engagement, define the fluid injector internal flow path (72) terminating in the annular outlet (73) and the fluid injector bore wall (85) defining the fluid injector central bore (74).

As to particular embodiments, the method can further include coupling the perforated tubular member (53) to a bath (31) having a bath interior space (43) to locate the perforated tubular member second end (56) a distance (59) within the bath interior space (43). The method can further include coupling a vacuum generator (42) to the bath (31), whereby the vacuum generator (42) can be adapted to generate a reduced pressure within the bath interior space (43).

As to particular embodiments, the method can further include coupling an extruder (87) configured to extrude a polymeric tube (3) to the fluid injector (69), whereby the polymeric tube (3) can pass through the fluid injector central bore (74) into the perforated tubular member passage (83) and into the bath interior space (43).

As to particular embodiments, the method can further include flowing the amount of coolant (32) through the annular outlet (73) of the fluid injector (69) between the perforated tubular member internal surface (60) and a polymeric tube external surface (7). As to particular embodiments, the reduced pressure within the bath interior space (43) can act to draw the polymeric tube external surface (7) toward the perforated tubular member internal surface (60) as the polymeric tube (3) passes through the perforated tubular member passage (83).

As to particular embodiments, the method can further include filling the bath interior space (43) with the amount of coolant (32) to a level exceeding a height of the perforated tubular member (53) extending the distance (59) within the bath interior space (43). As to particular embodiments, the method can further include disposing an extrudate outlet (36) within the bath (31) through which the polymeric tube (3) can pass to egress from the bath (31), and coupling an extrudate outlet seal (39) to the extrudate outlet (36), the extrudate outlet seal (39) configured to engage the polymeric tube external surface (7).

As to particular embodiments, the method can further include providing a jacket assembly (44) including a tubular jacket (45) having a tubular jacket length disposed between a tubular jacket first end (46) and a tubular jacket second end (47); coupling the tubular jacket first end (46) to a retaining plate (76) and coupling the tubular jacket second end (47) to a mounting flange (48) to define a jacket assembly internal space (62) fluidically coupled to the fluid injector central bore (74). The retaining plate (76) can have a retaining plate bore wall (88) which defines a retaining plate central bore (77) aligned with the fluid injector central bore (74). The mounting flange (48) can have a mounting flange bore wall (89) which defines a mounting flange central bore (49) aligned with the fluid injector central bore (74). The jacket assembly (44) can have a jacket assembly internal surface (64) defining the jacket assembly internal space (62) in which the amount of coolant (32) can flow.

A method of extruding a polymeric tube (2) can include passing the polymeric tube (3) through a fluid injector central bore (74) of a fluid injector (69) having a fluid injector internal flow path (72) terminating in an annular outlet (73); passing the polymeric tube (3) through a perforated tubular member first end (55) of a perforated tubular member (53) into a perforated tubular member passage (83) defined by a perforated tubular member internal surface (60); and flowing an amount of coolant (32) through the fluid injector internal flow path (72) and the annular outlet (73) to conduct the amount of coolant (73) between the perforated tubular member internal surface (60) and a polymeric tube external surface (7) of the polymeric tube (3) passing through the perforated tubular member passage (83). As to particular embodiments, the polymeric tube (3) can pass through the fluid injector central bore (74) upon egress from a die passage (30) of a die (29) of an extruder (87).

As to particular embodiments, the method of extruding a polymeric tube (2) can further include passing the polymeric tube (3) into a bath (31) having a bath interior space (43) surrounding a portion of the perforated tubular member (53), whereby a perforated tubular member second end (56) locates a distance (59) within the bath interior space (43). As to particular embodiments, the bath interior space (43) can be filled with an amount of coolant (32) to a level exceeding a height of the perforated tubular member (53) extending the distance (59) within the bath interior space (43). Accordingly, the coolant (32) can surround the perforated tubular member (53) and a polymeric tube (3) received within the perforated tubular member passage (83).

As to particular embodiments, the method of extruding a polymeric tube (2) can further include generating a reduced pressure within the bath interior space (43) using a vacuum generator (42) coupled to the bath (31), wherein the reduced pressure within the bath interior space (43) can act to draw the polymeric tube external surface (7) toward the perforated tubular member internal surface (60) as the polymeric tube (3) passes through the perforated tubular member passage (83).

As to particular embodiments, the method of extruding a polymeric tube (2) can further include passing the polymeric tube (3) through a jacket assembly (44) having a jacket assembly internal surface (64) defining a jacket assembly internal space (62) in which the amount of coolant (32) can flow, whereby the jacket assembly internal space (62) fluidically couples to the fluid injector central bore (74).

As to particular embodiments, the method of extruding a polymeric tube (2) can further include passing the polymeric tube (3) through an extrudate outlet (36) disposed within the bath (31) through which the polymeric tube (3) can pass to egress from the bath (31).

As can be easily understood from the foregoing, the basic concepts of the present invention may be embodied in a variety of ways. The invention involves numerous and varied embodiments of an extrusion system and methods for extruding a polymeric tube, including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of an "extruder" should be understood to encompass disclosure of the act of "extruding"—whether explicitly discussed or not—and, conversely, were there effectively disclosure of the act of "extruding", such a disclosure should be understood to encompass disclosure of an "extruder" and even a "means for extruding." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the extrusion systems and methods for extruding a polymeric tube herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. An extrusion system, comprising:
a perforated tubular member having a perforated tubular member length disposed between a perforated tubular member first end and a perforated tubular member second end, said perforated tubular member having a perforated tubular member external surface and a perforated tubular member internal surface defining a perforated tubular member passage between said perforated tubular member first and second ends; and
a fluid injector including:
a fluid injector central bore wall defining a fluid injector central bore aligned with said perforated tubular member internal surface; and
a fluid injector internal annular flow path which inwardly tapers to terminate in an annular outlet disposed about said fluid injector central bore adjacent said perforated tubular member first end, said annular outlet aligned with said perforated tubular member internal surface proximate said perforated tubular member first end to conduct an amount of coolant to said perforated tubular member internal surface.

2. The system of claim 1, wherein said fluid injector comprises a pair of annular rings which, upon mated engagement, define said fluid injector central bore wall, and said fluid injector internal annular flow path which inwardly tapers to terminate in said annular outlet disposed about said fluid injector central bore.

3. The system of claim 2, further comprising a bath having a bath interior space, said perforated tubular member coupled to said bath to locate said perforated tubular member second end a distance within said bath interior space.

4. The system of claim 3, further comprising an extruder configured to extrude a polymeric tube, said polymeric tube passing through said fluid injector central bore into said perforated tubular member passage and into said bath interior space.

5. The system of claim 4, wherein said bath comprises a level of coolant in said bath interior space exceeding a height of said perforated tubular member extending said distance within said bath interior space.

6. The system of claim 5, wherein said bath further comprises an extrudate outlet through which said polymeric tube passes to egress from said bath, said extrudate outlet having an extrudate outlet seal configured to engage said polymeric tube external surface.

7. An extrusion system, comprising:
a perforated tubular member having a perforated tubular member length disposed between a perforated tubular member first end and a perforated tubular member second end, said perforated tubular member having a perforated tubular member external surface and a perforated tubular member internal surface defining a perforated tubular member passage between said perforated tubular member first and second ends;

a fluid injector having a fluid injector internal flow path terminating in an annular outlet disposed adjacent said perforated tubular member first end, said annular outlet aligned with said perforated tubular member internal surface proximate said perforated tubular member first end to conduct an amount of coolant to said perforated tubular member internal surface;

said fluid injector having a fluid injector bore wall defining a fluid injector central bore disposed adjacent said perforated tubular member first end, said fluid injector bore wall aligned with said perforated tubular member internal surface; and a jacket assembly including a tubular jacket having a tubular jacket length disposed between a tubular jacket first end and a tubular jacket second end, said tubular jacket first end coupled to a retaining plate and said tubular jacket second end coupled to a mounting flange to define a jacket assembly internal space fluidically coupled to said fluid injector central bore, said retaining plate having a retaining plate bore wall which defines a retaining plate central bore aligned with said fluid injector central bore, said mounting flange having a mounting flange bore wall which defines a mounting flange central bore aligned with said fluid injector central bore.

8. The system of claim 7, wherein said jacket assembly has an internal surface defining said jacket assembly internal space which conducts said amount of coolant to said fluid injector.

9. The system of claim 8, further comprising an extrudate inlet seal coupled to said retaining plate bore wall configured to engage said polymeric tube external surface.

10. The system of claim 8, further comprising a bath having a bath interior space, said perforated tubular member coupled to said bath to locate said perforated tubular member second end a distance within said bath interior space.

11. The system of claim 10, further comprising an extruder configured to extrude a polymeric tube, said polymeric tube passing through said fluid injector central bore into said perforated tubular member passage and into said bath interior space.

12. The system of claim 11, wherein said bath comprises a level of coolant in said bath interior space exceeding a height of said perforated tubular member extending said distance within said bath interior space.

13. The system of claim 12, wherein said bath further comprises an extrudate outlet through which said polymeric tube passes to egress from said bath, said extrudate outlet having an extrudate outlet seal configured to engage said polymeric tube external surface.

14. A method of producing an extrusion system, said method comprising:

providing a perforated tubular member having a perforated tubular member length disposed between a perforated tubular member first end and a perforated tubular member second end, said perforated tubular member having a perforated tubular member external surface and a perforated tubular member internal surface defining a perforated tubular member passage between said perforated tubular member first and second ends;

providing a fluid injector including:
a fluid injector bore wall defining a fluid injector central bore; and
a fluid injector annular internal flow path which inwardly tapers to terminate in an annular outlet disposed about said fluid injector central bore;

disposing said fluid injector central bore wall adjacent said perforated tubular member first end to align said fluid injector bore wall with said perforated tubular member internal surface disposing said annular outlet adjacent said perforated tubular member first end; and aligning said annular outlet with said perforated tubular member internal surface of said perforated tubular member first end to conduct coolant to said perforated tubular member internal surface.

15. The method of claim 14, further comprising configuring said fluid injector as a pair of annular rings which, upon mated engagement, define said fluid injector central bore wall and said fluid injector annular internal flow path which inwardly tapers to terminate in said annular outlet disposed about said fluid injector bore and said fluid injector bore wall defining said fluid injector central bore.

16. The method of claim 15, further comprising coupling said perforated tubular member to a bath having a bath interior space to locate said perforated tubular member second end a distance within said bath interior space.

17. The method of claim 16, further comprising coupling a vacuum generator to said bath, said vacuum generator adapted to generate a reduced pressure within said bath interior space.

18. The method of claim 17, further comprising coupling an extruder configured to extrude a polymeric tube to said fluid injector, said polymeric tube passing through said fluid injector central bore into said perforated tubular member passage and into said bath interior space.

19. The method of claim 18, further comprising flowing said of coolant through said annular outlet of said fluid injector between said perforated tubular member internal surface and a polymeric tube external surface.

20. The method of claim 19, wherein said reduced pressure within said bath interior space acts to draw said polymeric tube external surface toward said perforated tubular member internal surface as said polymeric tube passes through said perforated tubular member passage.

21. The method of claim 20, further comprising:
providing a jacket assembly including a tubular jacket having a tubular jacket length disposed between a tubular jacket first end and a tubular jacket second end; and
coupling said tubular jacket first end to a retaining plate and coupling said tubular jacket second end to a mounting flange to define a jacket assembly internal space fluidically coupled to said fluid injector central bore;
said retaining plate having a retaining plate bore wall which defines a retaining plate central bore aligned with said fluid injector central bore;
said mounting flange having a mounting flange bore wall which defines a mounting flange central bore aligned with said fluid injector central bore.

22. A method of producing an extrusion system, comprising:
providing a perforated tubular member having a perforated tubular member length disposed between a perforated tubular member first end and a perforated tubular member second end, said perforated tubular member having a perforated tubular member external surface and a perforated tubular member internal surface defining a perforated tubular member passage between said perforated tubular member first and second ends;

providing a fluid injector having a fluid injector bore wall defining a fluid injector central bore, and a fluid injector internal flow path terminating in an annular outlet;

disposing said fluid injector central bore wall adjacent said perforated tubular member first end to align said fluid injector bore wall with said perforated tubular member internal surface and disposing said annular outlet adjacent said perforated tubular member first end; and aligning said annular outlet with said perforated tubular member internal surface of said perforated tubular member first end to conduct coolant to said perforated tubular member internal surface;

providing a jacket assembly including a tubular jacket having a tubular jacket length disposed between a tubular jacket first end and a tubular jacket second end; and coupling said tubular jacket first end to a retaining plate and coupling said tubular jacket second end to a mounting flange to define a jacket assembly internal space fluidically coupled to said fluid injector central bore;

said retaining plate having a retaining plate bore wall which defines a retaining plate central bore aligned with said fluid injector central bore;

said mounting flange having a mounting flange bore wall which defines a mounting flange central bore aligned with said fluid injector central bore.

23. The method of claim 22, further comprising disposing said perforated tubular member in a bath.

24. The method of claim 23, further comprising coupling a vacuum generator to said bath, said vacuum generator adapted to generate a reduced pressure within a bath interior space.

25. The method of claim 24, further comprising coupling an extruder configured to extrude a polymeric tube to said fluid injector, said polymeric tube passing through said fluid injector central bore into said perforated tubular member passage and into said bath interior space.

26. The method of claim 25, further comprising flowing said amount of coolant through said annular outlet of said fluid injector between said perforated tubular member internal surface and a polymeric tube external surface.

27. The method of claim 26, wherein said reduced pressure within said bath interior space acts to draw said polymeric tube external surface toward said perforated tubular member internal surface as said polymeric tube passes through said perforated tubular member passage.

* * * * *